(12) United States Patent  (10) Patent No.: US 7,828,543 B2
Herrera  (45) Date of Patent: Nov. 9, 2010

(54) DOUGH SHEETER CUTTER ROLLER

(75) Inventor: Michael L. Herrera, Los Alamitos, CA (US)

(73) Assignee: Casa Herrera, Inc., Pomona, CA (US)

( * ) Notice: Subject to any disclaimer, the term of this patent is extended or adjusted under 35 U.S.C. 154(b) by 470 days.

(21) Appl. No.: 11/829,858

(22) Filed: Jul. 27, 2007

(65) Prior Publication Data

US 2008/0026091 A1   Jan. 31, 2008

Related U.S. Application Data

(60) Provisional application No. 60/834,307, filed on Jul. 27, 2006.

(51) Int. Cl.
*A21C 3/02* (2006.01)
(52) U.S. Cl. .......................... 425/196; 83/662; 83/932; 425/310
(58) Field of Classification Search .................. 425/194, 425/298, 310, 363, 196; 83/343, 346, 662, 83/698.41, 932
See application file for complete search history.

(56) References Cited

U.S. PATENT DOCUMENTS

| | | | | | |
|---|---|---|---|---|---|
| 3,720,126 | A | * | 3/1973 | Kranz | 83/344 |
| 4,226,150 | A | * | 10/1980 | Reed | 83/346 |
| 4,759,247 | A | * | 7/1988 | Bell et al. | 83/346 |
| 5,498,148 | A | * | 3/1996 | Ouellette et al. | 425/298 |
| 6,530,771 | B1 | * | 3/2003 | Clark | 425/194 |

* cited by examiner

*Primary Examiner*—James Mackey
(74) *Attorney, Agent, or Firm*—Joseph C. Andras; Myers Andras Sherman LLP

(57) ABSTRACT

An improved dough sheeter having a pair of counterrotating sheeter rollers and a cutter roller rotating against a front one of the sheeter rollers to cut a pattern into a sheet of dough therebetween. The improvement is the cutter roller being formed from an oil-impregnated wear resistant plastic that results in a much longer cutter life. The dough sheeter's cutter roller may have axial shaft, a pair of cutter lift arms including a U-shaped end, and a pair of needle bearing assemblies, each needle bearing assembly located on a corresponding end of the axial shaft. Also disclosed is a method of manufacturing a cutter roller for a dough sheeter where the crown is formed before the cutting pattern is cut into the cutter roller.

2 Claims, 5 Drawing Sheets

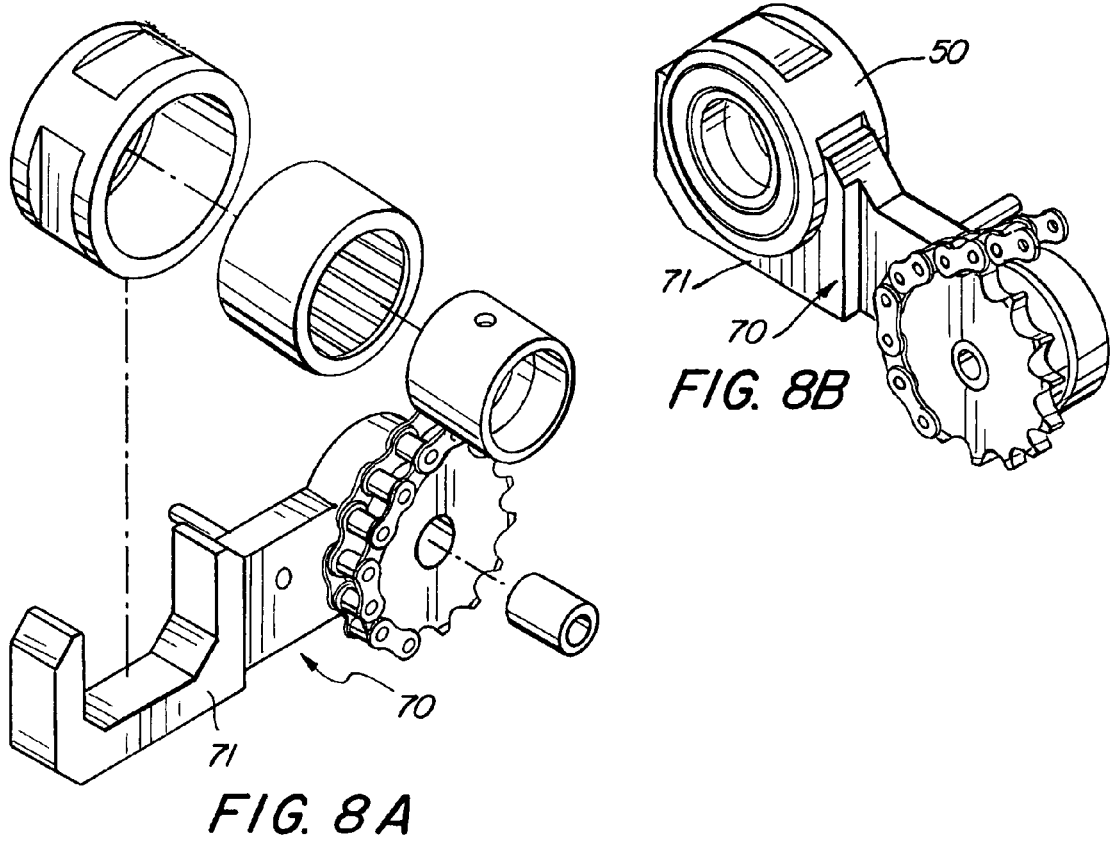
FIG. 8A
FIG. 8B
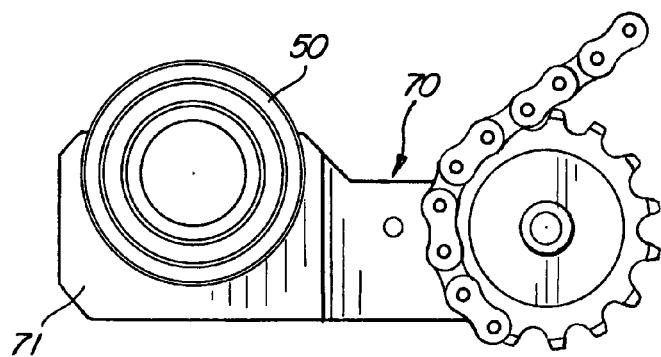
FIG. 9

US 7,828,543 B2

DOUGH SHEETER CUTTER ROLLER

CROSS REFERENCE TO RELATED APPLICATION

This non-provisional patent application claims the benefit of U.S. Provisional Patent Application Ser. No. 60/834,307, filed on Jul. 27, 2006, entitled "CUTTER MADE WITH IMPROVED BEARING SYSTEM, FORMED FROM OIL-IMPREGNATED PLASTIC, AND IMPROVED METHOD OF MAKING SAME", the entire contents of which are hereby incorporated by reference.

FIELD OF THE INVENTION

This invention relates generally to machinery used to produce Mexican food products such as chips or tortillas and, more particularly, to a dough sheeter cutter roller.

BACKGROUND OF THE INVENTION

In the Mexican food industry, tortillas, chips, and the like, are commonly formed by sheeting a mass of dough, or masa, into a sheet between a pair of counterrotating sheeter rollers, stripping the dough from the back roller (e.g. with a wire) so that it adheres only to the front roller, and then cutting a pattern from the sheet by rotating a so-called cutter roller against the surface of the front roller.

The patterned sheet is then stripped from the front roller (e.g. with a wire), with the product pieces falling down onto a conveyor belt, and with the surrounding web of "rework" masa, if any, returning to the hopper above the two sheeter rollers to be recombined with fresh masa.

A typical dough sheeter and its cutter roller are disclosed in U.S. Pat. No. 6,530,771 entitled "Rotary Cutter Handling System", which patent is assigned to the assignee of the present invention and hereby incorporated by reference as if fully set forth herein. A typical cutter roller is also depicted in U.S. Design Pat. No. Des. 391,125 without its stainless steel shaft, the entire disclosure if which is hereby incorporated by reference as if fully set forth herein. This particular design patent depicts a cutter roller that cuts a fish-shaped product pattern into the dough sheet, but more conventional cutter rollers produce triangular chips or round tortillas.

The cutter roller usually has a stainless steel shaft pressed through its length. Conventionally, as shown in FIGS. 1-3, the cutter roller has been supported between two spaced arms 20 (only one is shown), the stainless steel shaft of the cutter rotating with metal-to-metal contact within a brass bushing 30 that fits into a U-shaped end 21 of each lift arm 20.

Some cutter rollers have had their cutting portions made from brass, but they are relatively expensive to manufacturer. More recently, conventional cutter rollers have often been made from plastics like UHMW, a plastic that is relatively soft and that wears quickly, or DELRON®, a plastic that is relatively hard and brittle that chips and also wears quickly. In either case, because the walls of the pattern formed in the UHMW or DELRON® cutter tend to wear against the surface of the sheeter roller, the cutter roller has a short life span that can be as low as only 1-3 months.

There remains a need therefore for a cutter roller with an improved bearing system and that is inexpensive to manufacture and has a long life span.

BRIEF SUMMARY OF THE INVENTION

In a first aspect, the invention may be regarded as an improved dough sheeter having a pair of counterrotating sheeter rollers and a cutter roller rotating against a front one of the sheeter rollers to cut a pattern into a sheet of dough therebetween, the improvement comprising the cutter roller being formed from an oil-impregnated wear resistant plastic.

In a second aspect, the invention may be regarded as a dough sheeter comprising: a cutter roller having an axial shaft with ends extending from opposite ends thereof; a pair of cutter lift arms including a U-shaped end; a pair of needle bearing assemblies, each needle bearing assembly located on a corresponding end of the axial shaft of the cutter roller, wherein each needle bearing assembly further includes a housing assembly having an outer race, wherein the outer race of each housing assembly has notches which engage the U-shaped end of a corresponding one of the cutter lift arms. The cutter roller is preferably formed from an oil-impregnated plastic.

In a third aspect, the invention may be regarded as a method of forming a cutter roller for a dough sheeter comprising the steps of: providing a roller blank of a desired diameter; boring an axial aperture in the roller blank; installing a shaft in the axial aperture of the roller blank; creating a crown on the roller blank by removing material from the roller blank to create a crowned roller blank; and machining the cutting pattern into the crowned roller blank to create a finished cutter roller. The roller blank is formed from an oil-impregnated plastic.

It is an object of the invention to provide an improved dough sheeter.

It is a further object of the invention to provide an improved cutter roller.

It is a further object of the invention to provide an improved interface between the cutter roller and support therefore.

It is a further object of the invention to provide a cutter roller that is inexpensive to manufacture.

It is a further object of the invention to provide a longer lasting cutter roller.

The just summarized invention may be better understood by reviewing the preferred embodiment disclosed in the following description and related drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below or illustrated in the figures, of which:

FIG. 8A is exploded perspective view a improved cutter roller lift arm which receive the needle bearing and housing assembly;

FIG. 8B is a perspective view of the improved cutter roller lift arm and the needle bearing and housing assembly;

FIG. 9 is a side view of the improved cutter roller lift arm and the needle bearing and housing assembly;

DETAILED DESCRIPTION OF THE PREFERRED EMBODIMENT

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

Figure 1:
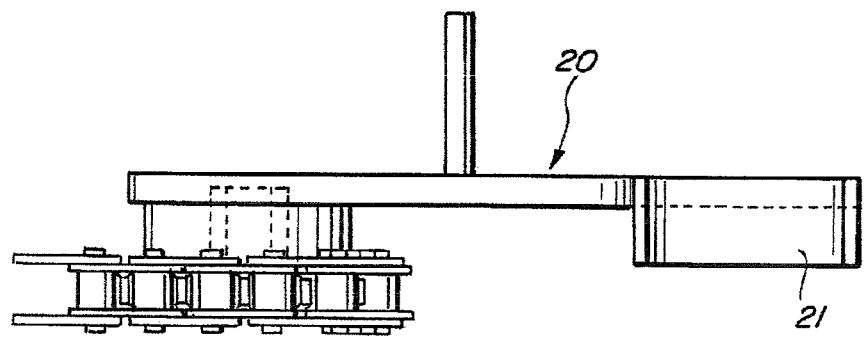
FIG. 1 is a top view of a cutter roller lift arm, two such lift arms being employed in a typical dough sheeter.
Figure 2:
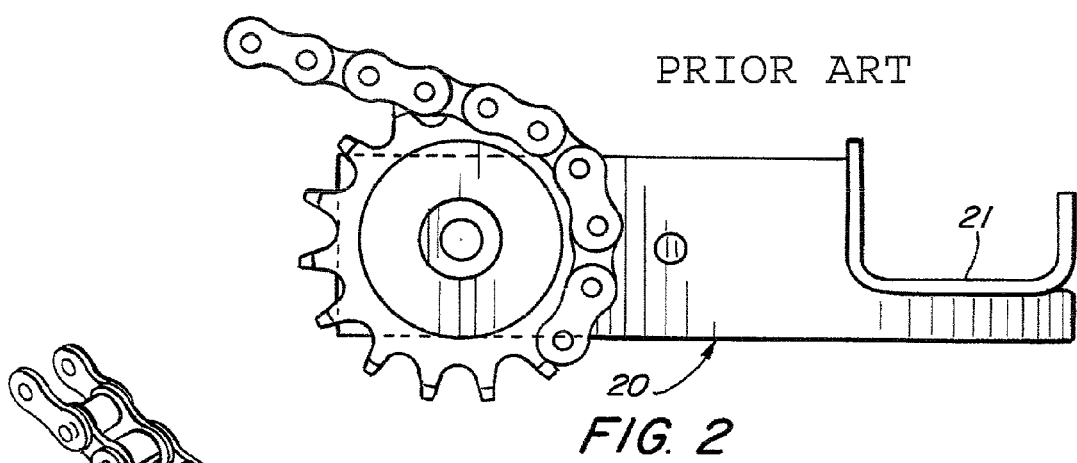
FIG. 2 is a side elevation view of the cutter roller lift arm of FIG. 1.
Figure 3:
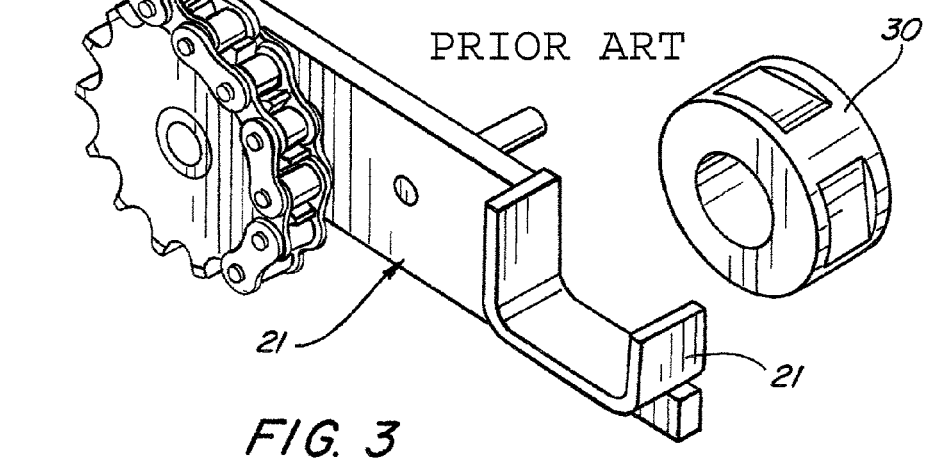
FIG. 3 is an exploded perspective view of the cutter roller lift arm of FIGS. 1 and 2 and a conventional brass bushing which fits into the lift arm and rotatably engages a shaft of a cutter roller (not shown)
Figure 4:
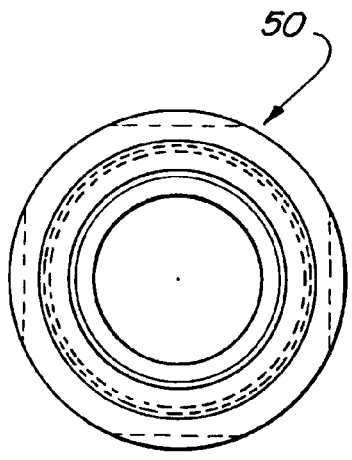
FIG. 4 is an end view of a needle bearing and housing assembly to be combined with the shaft of a cutter roller according to an embodiment of the invention.
Figure 5:
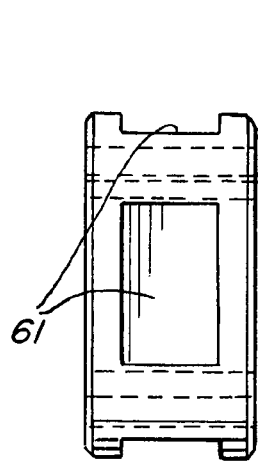
FIG. 5 is a side view of the needle bearing and housing assembly.
Figure 6:
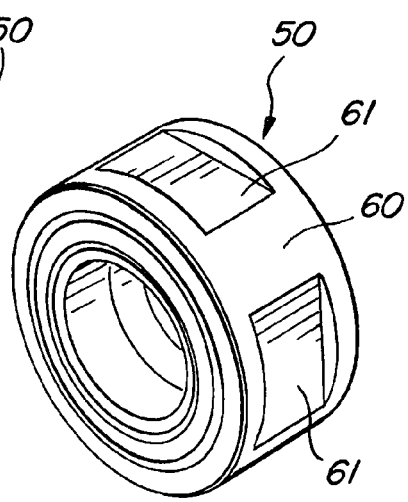
FIG. 6 is a perspective view of the needle bearing.
Figure 7:
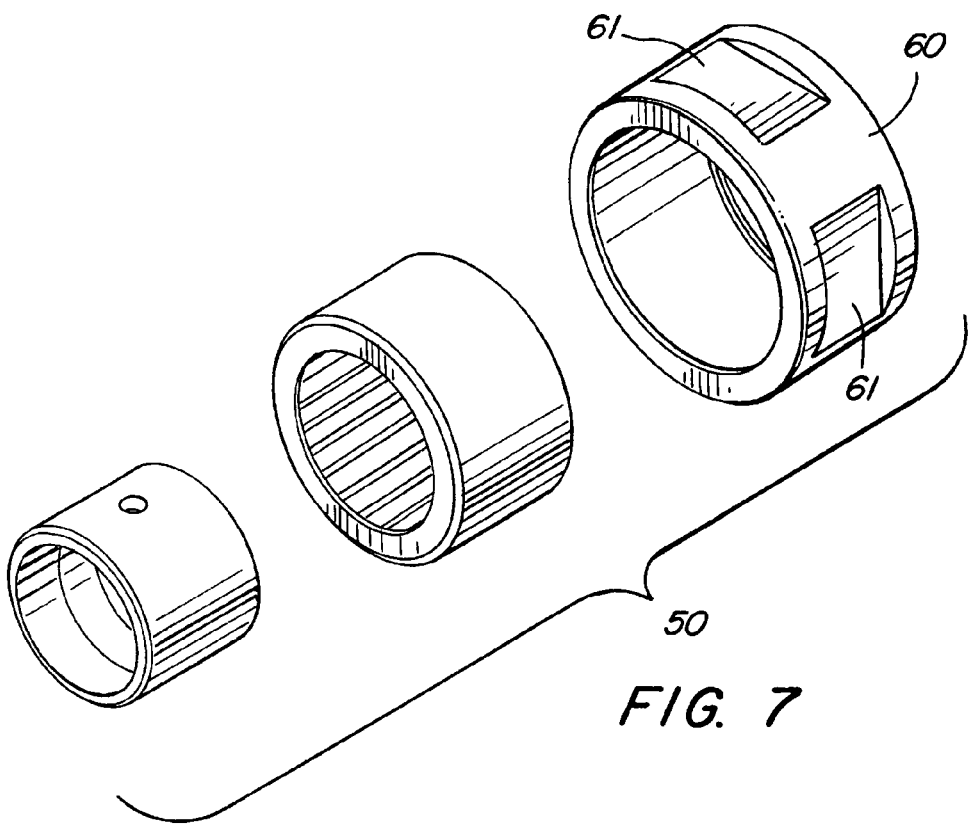
FIG. 7 is an exploded perspective view of the needle bearing and housing assembly.

FIGS. 4-9 show a new needle bearing 50 to be combined with the shaft of a cutter roller according to an embodiment of the invention. As shown, an outer race 60 of the preferred needle bearing 50 has side flats 61 that allow it to slidably engage a new pair of support arms or cutter lift arms 70 as best shown in FIGS. 8-9. The new cutter lift arms 70 have an enlarged U-shaped end 71 that is provided in order to fit the larger size of the inner and outer races of the needle bearing 50. Other embodiments may be used that permit the needle bearing configuration to be used in a retrofit fashion with a standard arm like that shown in FIG. 3, but there may be issues of sizing and durability if the needle bearing's races are designed to fit into an existing arm.

Figure 10:
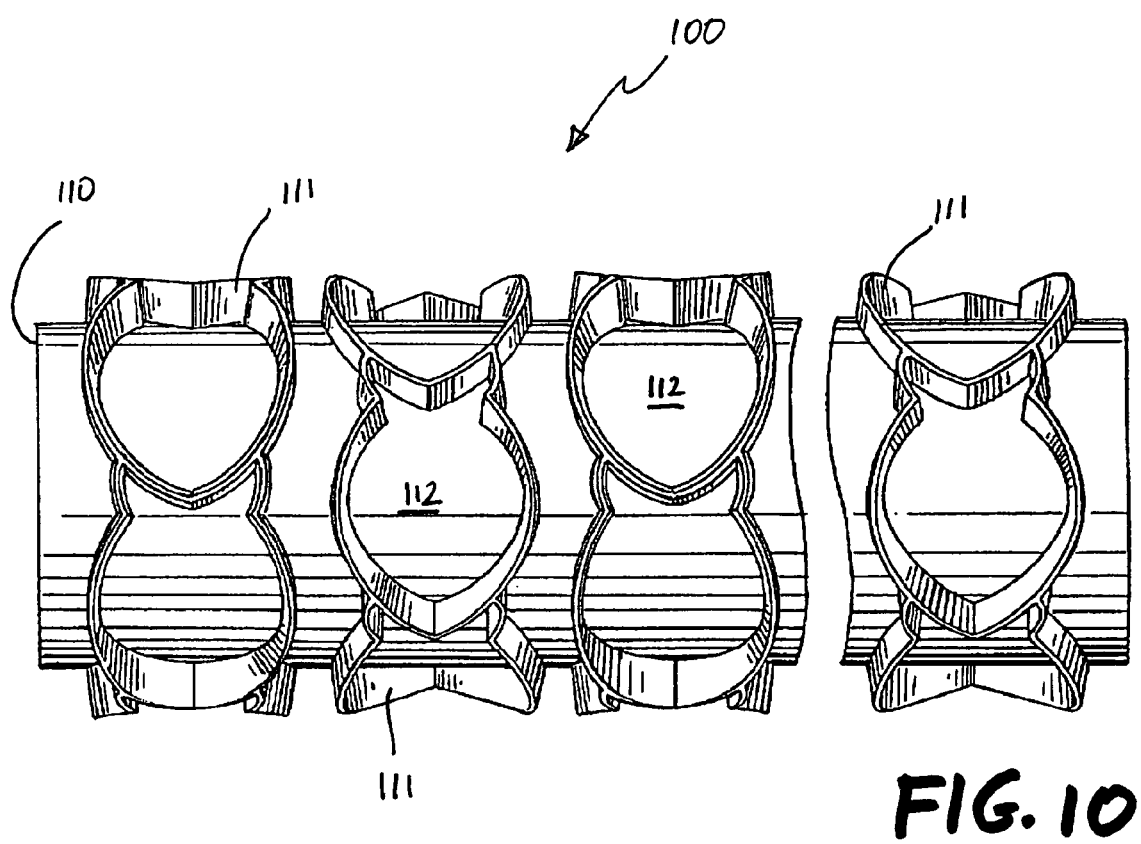
FIG. 10 shows a cutter roller 100 which has cutting walls 111 defining product shapes 112 (e.g. chips and tortillas) and may be made according to an embodiment of the present invention.

FIG. 10 depicts a cutter roller 100 having a main body 110 and a plurality of cutter walls 11 which are formed therein (e.g. via a CNC milling process) to provide a plurality of cutter patterns 112. As described above, typical cutter rollers are manufactured from UHMW or nylon, materials which are either quite soft or quite brittle such that they tend to wear against the sheeter roller and require replacement in as little as 1-3 months.

It has been discovered that a significantly improved life span can be achieved by manufacturing the cutter roller 100 from an oil-impregnated plastic such as NYLOIL® which is manufactured and/or distributed by Cast Nylons Limited. A cutter roller formed from an oil-impregnated plastic can be formed from substantially the same methods as used to make cutter rollers from UHMW or delron (e.g. CNC milling). The lifespan of a conventional cutter has only been 4-6 months. By contrast, an experimental cutter roller manufactured in accordance with this invention has been in operation for nearly a year.

The CNC machining process for making the cutter roller has also been improved. Normally, after you have the cutter roller at the correct diameter, you bore the roller and then put the cutter roller on a CNC machine to cut out material that leaves a plurality of narrow walls 111 that define the product patterns 112. After that, you put in the stainless steel shaft (not shown) through the length of the cutter 100, and then cut in a profile or crown using a lathe and a curved template, the crown permitting the cutter to fully engage the width of the front roller when held across its span by its axial shaft.

It has been discovered that it is better to cut the crown into the cutter roller 100 before cutting walls 11 and corresponding product patterns 112 into the cutter roller 100 with the CNC machine. In the conventional sequence, the lathe tool tends to leave chips or burrs on the walls 111 that define the product patterns 112. Those chips or burrs must be cleaned off by hand. By boring out the roller 100 and putting the shaft in first, and then adding the crown via a lathing process, and then moving to the CNC machine, there is no need to clean the chips or burrs and the overall products is more dimensionally precise and functions better in use.

Figure 11:
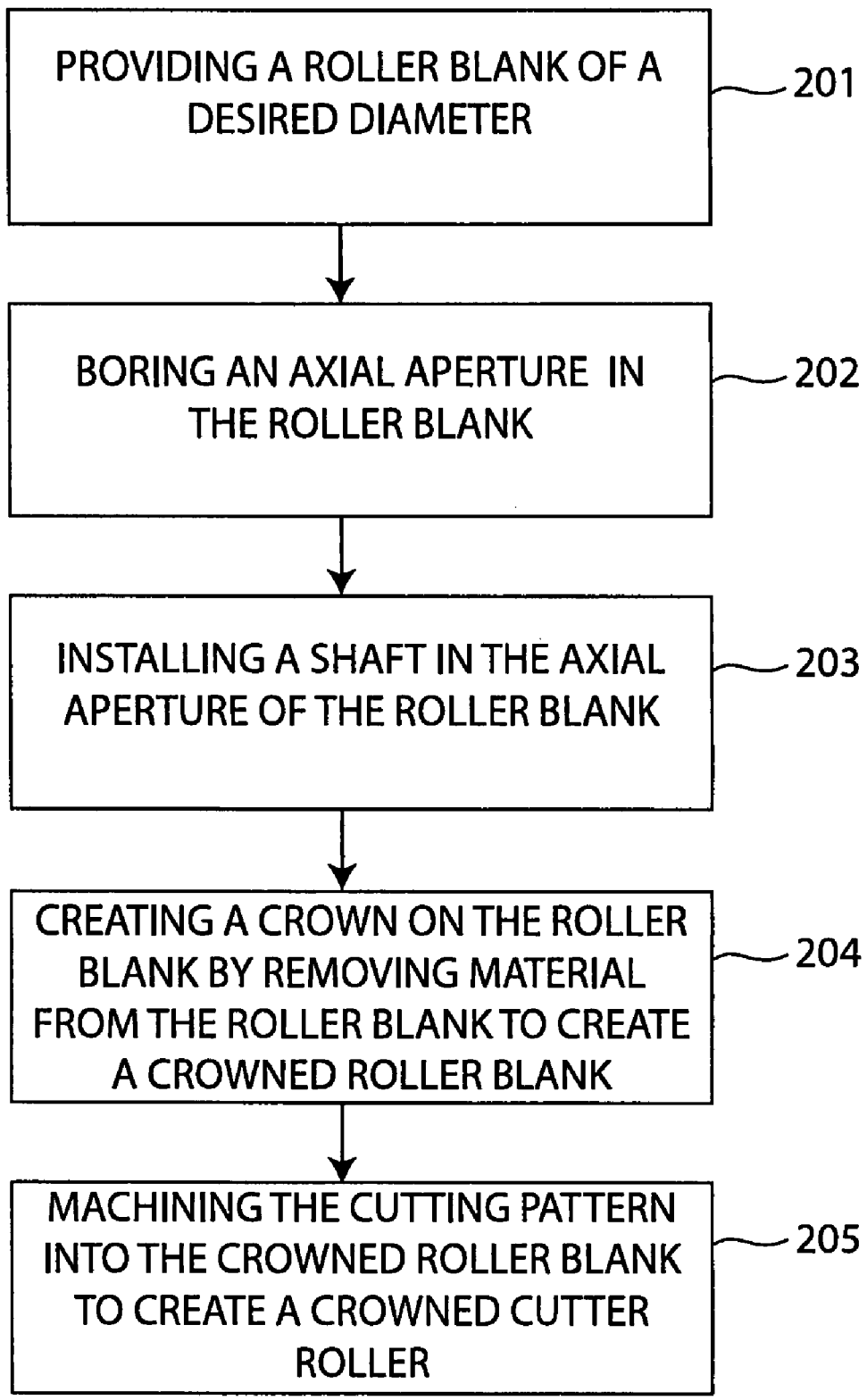
FIG. 11 shows the steps of a preferred method of manufacturing a cutter roller according to an embodiment of the invention.

FIG. 11 is a block diagram illustrating the steps of a preferred embodiment of manufacturing a cutter roller 100. As shown, the preferred method includes the following steps: Step 201—providing a roller blank of a desired diameter; Step 202—boring an axial aperture in the roller blank; Step 203—installing a shaft in the axial aperture of the roller blank; Step 204—creating a crown on the roller blank by removing material from the roller blank to create a crowned roller blank; and Step 205—machining the cutting pattern into the crowned roller blank to create a finished cutter roller.

The just described embodiment is but one of many possible embodiments of the invention, which invention is described in the following claims.

I claim:

1. An improved dough sheeter having a pair of counterrotating sheeter rollers and a cutter roller rotating against a front one of the sheeter rollers to cut a pattern into a sheet of dough therebetween, the improvement comprising:
the cutter roller being formed from an oil-impregnated wear resistant plastic.

2. A dough sheeter comprising:
a cutter roller having an axial shaft with ends extending from opposite ends thereof, wherein the cutter roller is formed from an oil-impregnated plastic;
a pair of cutter lift arms including a U-shaped end;
a pair of needle bearing assemblies, each needle bearing assembly located on a corresponding end of the axial shaft of the cutter roller, wherein each needle bearing assembly further includes a housing assembly having an outer race, wherein the outer race of each housing assembly has notches which engage the U-shaped end of a corresponding one of the cutter lift arms.

* * * * *